3,032,576
N-SUBSTITUTED DERIVATIVES OF AMINOALKYLSILANES

Edward L. Morehouse, Snyder, N.Y., assignor to Union Carbide Corporation, a corporation of New York
No Drawing. Filed Feb. 20, 1961, Ser. No. 90,174
11 Claims. (Cl. 260—448.2)

This invention relates to novel organosilanes and, more particularly, to N-substituted derivatives of aminoalkylsilanes.

My novel organosilanes are represented by the formula:

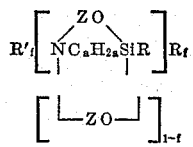

wherein R is a monovalent group from the class consisting of hydrocarbon and alkoxy groups and need not be the same throughout the same molecule, R' is a monovalent group from the class of hydrogen, hydrocarbon and —C$_a$H$_{2a}$SiR$_3$, Z is a divalent hydrocarbon group derived from a monoepoxide by opening of the oxirane ring, the amino nitrogen is interconnected to silicon through no other linkage than

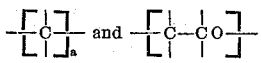

linkages, nitrogen is directly connected to no other elements than carbon and hydrogen, silicon is directly connected to no other elements than carbon and oxygen, $a$ is an integer from 3 to 6, N is separated from Si by at least 3 carbon atoms of each C$_a$H$_{2a}$ group and $f$ is an integer from 0 to 1. The novel organosilanes of this invention include aminoalkylsilanes having the formulas:

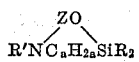

and

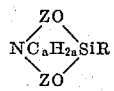

wherein R, R', Z and $a$ have the meanings defined hereinabove.

Thus, the organosilanes contemplated by this invention also include those having the formula:

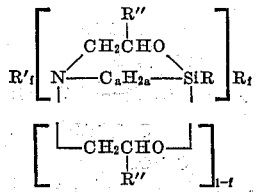

wherein R, R', $f$ and $a$ are as previously defined and R" is a monovalent hydrocarbon group including alkyl, aryl, alkaryl, aralkyl, alkenyl, cycloalkyl and cycloalkenyl groups, nitrogen being directly connected to no other elements than carbon and hydrogen and silicon being directly connected to no other elements than carbon and oxygen. Having thus defined the broad invention the following classes of compounds are among those contemplated by this invention:

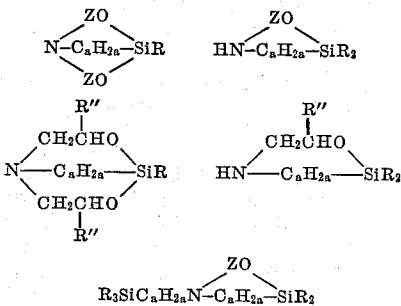

Preferably, R contains from 1 to about 10 carbon atoms and includes monovalent hydrocarbon groups such as methyl, ethyl, tertiary-butyl, iso-octyl, cyclopentyl, cyclohexyl, phenyl, n-butylphenyl, phenylethyl, mesityl, naphthyl, vinyl, allyl, cycloheptenyl, and the like, and alkoxy groups such as methoxy, propoxy, iso-hexoxy, decoxy, and the like. The R groups most preferred are lower alkyl and lower alkoxy groups such as methyl, ethyl, iso-propyl, butyl, methoxy, propoxy and iso-butoxy.

When R' is a monovalent hydrocarbon group it preferably contains from 1 to about 10 carbon atoms and includes groups such as methyl, ethyl, tertiary-butyl, iso-octyl, cyclopentyl, cyclohexyl, phenyl, n-butylphenyl, phenylethyl, mesityl, naphthyl, vinyl, allyl, cycloheptenyl and the like. The R' groups most preferred are lower alkyl groups such as methyl, ethyl, iso-propyl and butyl.

Preferably the Z group is an ethylene group or hydrocarbon-substituted ethylene group containing from 2 to about 23 carbon atoms. Examples of Z groups are presented hereinbelow.

The organosilanes of this invention are advantageously produced by reacting a silane of the formula:

where R' and $a$ are as previously defined and silicon is attached to no other groups than monovalent hydrocarbon, hydroxy and alkoxy groups and is connected to at least one hydroxy or alkoxy group with a monoepoxide composed of carbon, hydrogen and oxirane oxygen. The reaction theoretically requires one mole of the monoepoxide for each mole of amino hydrogen desired to be displaced, although in practice greater or lesser amounts can be employed. The reaction is illustrated by the equation

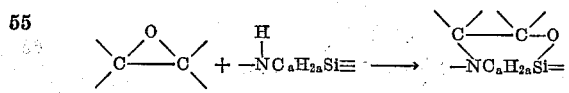

wherein

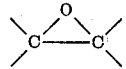

represents the monoepoxide and

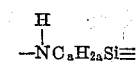

the aminoalkylsilane. The product as represented by

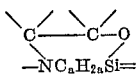

is a compound having the formula falling under the first formula presented herein. The reaction is preferably carried out in the presence of a low molecular weight aliphatic alcohol or in the presence of a catalytic amount of water in which event lower temperatures and pressures can be used. For example, in the presence of a catalyst such as an aliphatic alcohol or water, the reaction proceeds smoothly at room temperature and atmospheric pressure. However, in the absence of such a catalyst, high temperatures of over 100° C. are required. When an alcohol catalyst is employed, no superatmospheric pressures are required. For ease of reaction and ease of handling, the reaction is carried out in a solvent such as methanol, cyclohexanol, dioxane, benzene and the like. Other reaction conditions such as temperature and pressure are not otherwise narrowly critical.

Monoepoxides employed as starting materials in making the organosilanes of this invention are those organic compounds containing one epoxy group and which are composed of carbon, hydrogen and oxirane oxygen. By the term "epoxy," as used herein to designate a group or compound, is meant a group composed of, or a compound containing, oxirane oxygen attached to two vicinal carbon atoms. Illustrative of suitable monoepoxides are ethylene oxide, propylene oxide, butadiene monoxide, styrene oxide, 2,3-epoxypropylbenzene, 1-hexene oxide, ethylvinylbenzene oxide, divinylbenzene monoxide, vinylcyclohexane oxide, 1,2-diisobutylene oxide, 1,2-epoxy-4-pentene, isoprene oxide, 2,5-dimethyl-5,6-epoxyhexane, 1,2-epoxyhexadecane, vinylcyclohexene monoxide, cyclohexene oxide, 2,3-epoxy-2,4,4-trimethylpentane, 2,3-epoxybutane, 2,5-dimethyl-5,6-epoxy-1-hexene, cyclopentene oxide, 11,12-epoxytricosane, 4-methyl-1,3-pentadiene monoxide, 2,3-epoxy-4-methylpentane and the like. The Z groups derived from the monoepoxides set forth in the preceding paragraph are, respectively, ethylene, methylethylene, vinylethylene, phenylethylene, benzylethylene, butylethylene, (ethylphenyl)ethylene, (vinylphenyl)ethylene, cyclohexylethylene, 1-methyl-1-neopentylethylene, allylethylene, isopropenylethylene and 1-methyl-1-vinylethylene, 1-methyl-1-isopentylethylene, tetradecylethylene, vinyl-1,2-cyclohexylene, 1,2-cyclohexylene, 1,1-dimethyl-2-t-butylethylene, 1,2-dimethylethylene, 1-methyl-1-isopenten-3-ylethylene, 1,2-cyclopentylene, 1-decyl-2-undecylethylene, (1-isobutenyl)ethylene and 1,1-dimethyl-2-vinylethylene, 1-methyl-2-isopropylethylene, and the like.

Illustrative of aminoalkylsilanes which are employed as starting materials in making my novel organosilanes are gamma-aminopropyltriethoxysilane, delta-aminobutylmethyldiethoxysilane, gamma - aminobutyldimethylethoxysilane, beta - aminoethylphenyldipropoxysilane, delta-aminobutylphenyldiethoxysilane and the like.

Typical of the organosiloxanes made by my invention are those having the following formulae:

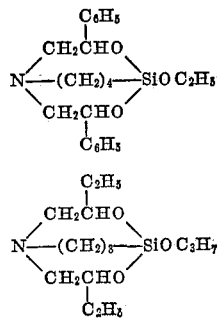

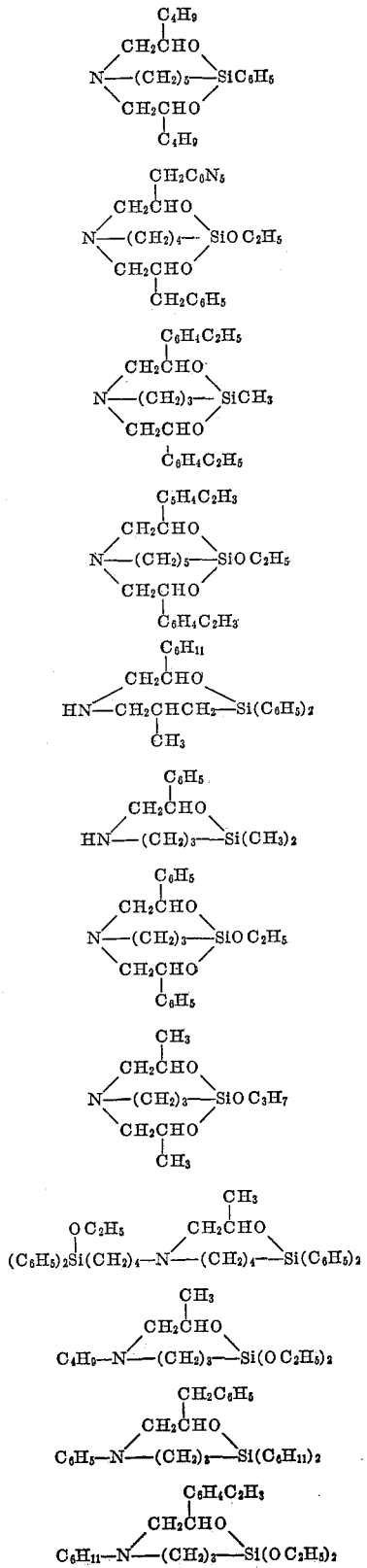

My novel organosilanes have been found to be useful in a variety of applications in the synthetic polymer art and have been found to be particularly useful as flocculating agents for aqueous dispersions of clay. When added to aqueous clay dispersions in amounts of as little as 1 weight percent based on the amount of water, my organosilanes cause rapid flocculation and settling of the dispersed clay. The monovalent organosilanes are also useful in the preparation of organopolysiloxanes by hydrolysis and condensation. Such organopolysiloxanes have uses in the synthetic polymer art as oils, bonding resins, and the like. These compounds are useful as sequestering agents for heavy metals such as iron and copper. The following examples are presented.

EXAMPLE 1

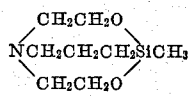

To a 500 cc. flask equipped with gas inlet tube, thermometer, magnetic stirrer, and Dry Ice condenser, were added gamma-aminopropylmethyldiethoxysilane (95.7 grams, 0.5 mole) and 75 cc. of absolute ethanol. Ethylene oxide (48.5 grams, 1.1 moles) was volatilized into the stirred solution over a period of about an hour. The temperature was maintained in the range of 17° C. to 50° C. during the addition by external cooling. The liquid was then stripped at reduced pressure at a maximum temperature of 60° C., and the distillate then fractionated by distillation at reduced pressure. A fraction (I) (7.1 grams) was obtained at 70° C. to 74° C./0.9 mm. A second fraction (II) (35.4 grams) was obtained at 74° C. to 76° C./0.8 mm. The second fraction had an M.P. of 57° C. to 58° C. A third fraction (III) (14.7 grams) was obtained at 76° C. to 90° C./0.7 mm. The second fraction, a crystalline solid, was analyzed. Infrared spectrum fitted the tertiary amine-cyclic silane structure shown above. *Microanalysis.*—Calc. for $C_8H_{17}SiNO_2$: C, 51.3; H, 9.1; Si, 15.0; N, 7.5; M.W., 187. Found: C, 51.2; H, 8.7; Si, 14.9; N, 7.4; M.W., 188±19.

EXAMPLE 2

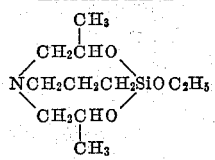

To a 500 cc. flask equipped with dropping funnel, thermometer, magnetic stirrer and water condenser were added gamma-aminopropyltriethoxysilane (110.7 grams, 0.5 mole) and 75 cc. of absolute ethanol. Propylene oxide (63.9 grams, 1.1 moles) was added dropwise to the stirred solution. The temperature of the reaction mixture slowly rose to 55° C. (reflux). Stirring was continued for 16 hours. The reaction product was stripped at reduced pressure to a maximum temperature of 60° C. A colorless solid was obtained. This solid was heated under reduced pressure, and several liquid fractions were obtained by distillation through a Vigreaux column. All fractions could be crystallized by cooling below room temperature. One fraction obtained at 101° C. to 104° C./0.9 mm. was analyzed. Infrared spectrum fitted the tertiary amine cyclic silane structure shown above. *Microanalysis.*—Calc. for $C_{11}H_{23}SiNO_3$: C, 53.9; H, 9.4; Si, 11.3; N, 5.7; M.W., 245. Found: C, 53.4; H, 8.9; Si, 11.7; N, 5.1; M.W., 225±23.

EXAMPLE 3

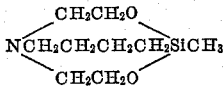

To a 500 cc. flask equipped with gas inlet tube, magnetic stirrer, thermometer and Dry Ice condenser were added delta-aminobutylmethyldiethoxysilane (102.7 grams, 0.5 mole) and 77 cc. of absolute ethanol. Ethylene oxide (48.5 grams, 1.1 moles) was volatilized into the stirred solution over a period of about two hours. The reaction temperature was maintained at 20° C. to 40° C. by external cooling. The reactants were stirred for 16 hours and then the product stripped at reduced pressure at a maximum temperature of 70° C. A white solid was obtained. This solid was heated under reduced pressure, and several liquid fractions were obtained by distillation through a Vigreaux column. All fractions were crystalline solids at room temperature. One fraction obtained at 93° C. to 94° C./1.7 mm. had a melting point of 34° C. to 36° C. This fraction was analyzed. Infrared spectrum fits the tertiary amine-cyclic silane structure shown above. *Microanalysis.*—Calc. for $C_9H_{19}SiNO_2$: C, 53.7; H, 9.5; Si, 14.0; N, 6.9; M.W., 201. Found: C, 55.9; H, 9.4; Si, 13.3; N, 6.7; M.W., 185±19.

EXAMPLE 4

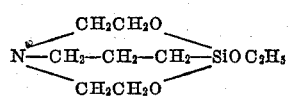

To a 500 cc. flask equipped with gas inlet tube, thermometer and magnetic stirrer, were added 110.7 grams (0.5 mole) of gamma-aminopropyltriethoxysilane and 50 cc. of absolute ethanol. Ethylene oxide in an amount of 48.5 grams (1.1 moles) was passed slowly into the solution which was continuously stirred. The addition of the ethylene oxide required a period of about an hour. During this time, the temperature of the reaction mixture rose to a maximum of 51° C. The reaction mixture was stirred for several hours and then stripped at reduced pressure at a temperature not greater than 50° C. A portion of this material was fractionated at reduced pressure to yield one fraction at 110° C. to 117° C. at 0.5 mm. of Hg pressure. At room temperature, this fraction was a white, crystalline solid having a melting point of 51° C. to 54° C. Infrared spectrum of the fraction fits the tertiary amine-cyclic silane structure. Microanalysis of the fraction gave the following results:

|  | C | H | Si | N | M.W. |
| --- | --- | --- | --- | --- | --- |
| Calculated for $C_9H_{19}SiNO_2$ | 49.8 | 8.8 | 12.9 | 6.4 | 217 |
| Found | 48.7 | 8.4 | 13.1 | 5.8 | 233±23 |

EXAMPLE 5

To each of five separate test tubes there were added 0.4 gram of powdered clay and 8 to 10 cubic centimeters of water. To test tubes 1, 2, 3 and 4 there were added, respectively, 0.1 gram of the organosilane made in Example 4, 0.1 gram of the organosilane made in Example 2, 0.1 gram of delta-aminobutylmethylsiloxane cyclic tetramer and 0.1 gram of delta-aminobutylmethyldiethoxysilane. Nothing further was added to test tube 5 which was maintained as a control. All test tubes were shaken vigorously to obtain dispersions and then the clay was allowed to settle. The performance of the contents of each test tube was given a rating based on the appearance of the contents after standing for one minute. These ratings are:

A=excellent, i.e., rapid flocculation and settling of the clay leaving a substantially clear supernatant liquor.
B=good.
C=fair.
D=poor.

The following results were obtained.

| Test tube: | Rating |
| --- | --- |
| 1 | A |
| 2 | A |
| 3 | D |
| 4 | D |
| 5 | D |

EXAMPLE 6

*Sequestering of Fe (III) and Cu (II) by Alkanolaminoalkysilanes*

Aqueous standard solutions of 0.1 molar ferric nitrate and cupric nitrate were prepared and also 0.1 molar solutions of the following two cyclic derivatives of hydroxyethylaminopropylsilanes:

(A) 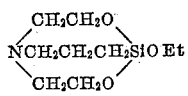

(B) 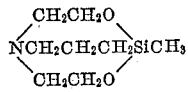

Each test was conducted by addition of 0.5 cubic centimeter of standard Fe (III) or Cu (II) to a 10 cubic centimeter volumetric flask, 2.0 cubic centimeters of A or B and dilution to 10 cubic centimeters with 0.1 molar sodium hydroxide. Each solution was heated to near the boiling point, then cooled to room temperature. The pH of each of the resultant solutions was about 12. [Normally, at this pH (and even at a pH as low as 6) in the absence of a sequestering agent ferric and cupric hydroxides are precipitated.] For comparative purposes, 0.05 molar solutions of the tetra-sodium salt of ethylenediamine tetraacetic acid ($Na_4EDTA$) were tested similarly. In each case, the mole ratio N:metal was 4:1. The results are shown in the following table:

| Amine | Metal | Results |
|---|---|---|
| A | Fe | Clear brown solution. |
| A | Cu | Clear blue solution. |
| B | Fe | Brown precipitate. |
| B | Cu | Clear blue solution. |
| $Na_4EDTA$ | Fe | Brown precipitate. |
| $Na_4EDTA$ | Cu | Clear blue solution. |

The test shows that both A and B were excellent sequestering agents for Cu (II). For Fe (III) compound A was even more effective than $Na_4EDTA$.

This application is a continuation-in-part of my copending application Serial No. 727,534, filed April 10, 1958, now abandoned.

What is claimed is:

1. A nitrogen-substituted aminoalkylsilane selected from the class consisting of compounds having the formulas:

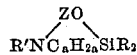

and

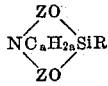

wherein R is selected from the group consisting of monovalent hydrocarbon groups and alkoxy groups and contains from 1 to about 10 carbon atoms, R' is selected from the group consisting of hydrogen, monovalent hydrocarbon groups containing from 1 to about 10 carbon atoms and $-C_aH_{2a}SiR_3$ groups, $a$ is an integer having a value from 3 to 6, N is separated from Si by at least 3 carbon atoms of each $C_aH_{2a}$ group, and Z is a group selected from the class consisting of ethylene and hydrocarbon-substituted ethylene and contains from 2 to about 23 carbon atoms.

2. An aminoalkylsilane in accordance with claim 1 wherein R is ethoxy.

3. An aminoalkylsilane in accordance with claim 1 wherein R is methyl.

4. An aminoalkylsilane in accordance with claim 1 wherein R' is hydrogen.

5. An aminoalkylsilane in accordance with claim 1 wherein Z is ethylene.

6. An aminoalkylsilane in accordance with claim 1 wherein Z is methylethylene.

7. A nitrogen-substituted aminoalkylsilane having the formula:

wherein R is selected from the group consisting of monovalent hydrocarbon groups and alkoxy groups and contains from 1 to about 10 carbon atoms, $a$ is an integer having a value from 3 to 6, N is separated from Si by at least 3 carbon atoms of the $C_aH_{2a}$ group, and Z is a group selected from the class consisting of ethylene and hydrocarbon-substituted ethylene and contains from 2 to about 23 carbon atoms.

8. The aminoalkylsilane:

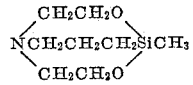

9. The aminoalkylsilane:

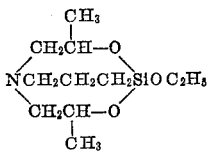

10. The aminoalkylsilane:

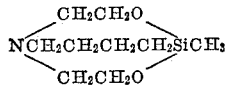

11. The aminoalkylsilane:

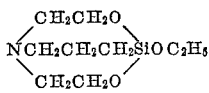

No references cited.